Dec. 9, 1969 W. C. TRETHEWEY 3,482,956
METHOD AND APPARATUS FOR OPERATING A GLASS MELTING FURNACE
Filed Jan. 21, 1966 5 Sheets-Sheet 1

INVENTOR.
WILLIAM C. TRETHEWEY
BY
Staelin & Overman
ATTORNEYS

Dec. 9, 1969  W. C. TRETHEWEY  3,482,956
METHOD AND APPARATUS FOR OPERATING A GLASS MELTING FURNACE
Filed Jan. 21, 1966   5 Sheets-Sheet 2

INVENTOR.
WILLIAM C. TRETHEWEY
BY
Staelin + Overman
ATTORNEYS

INVENTOR.
WILLIAM C. TRETHEWEY

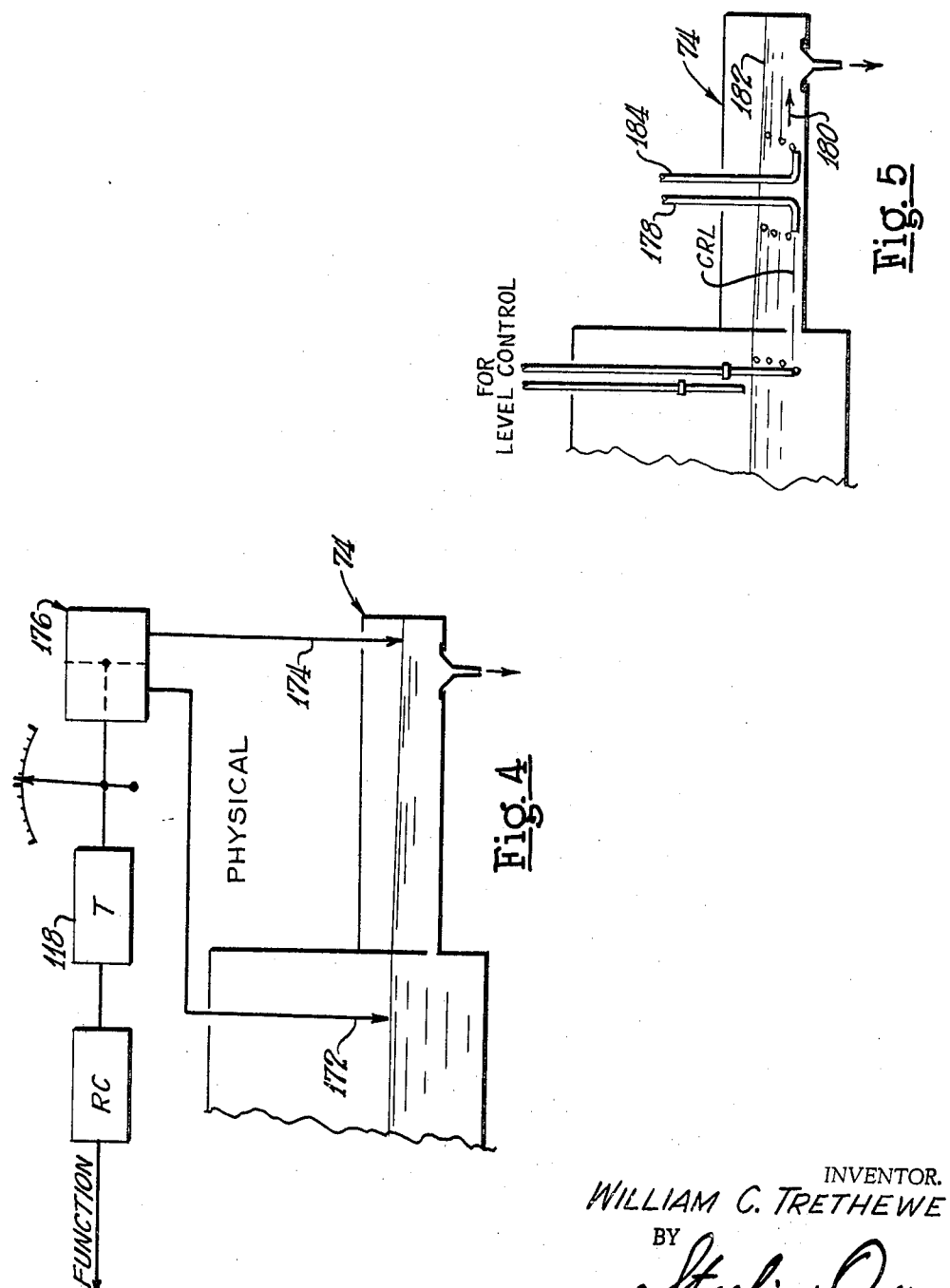

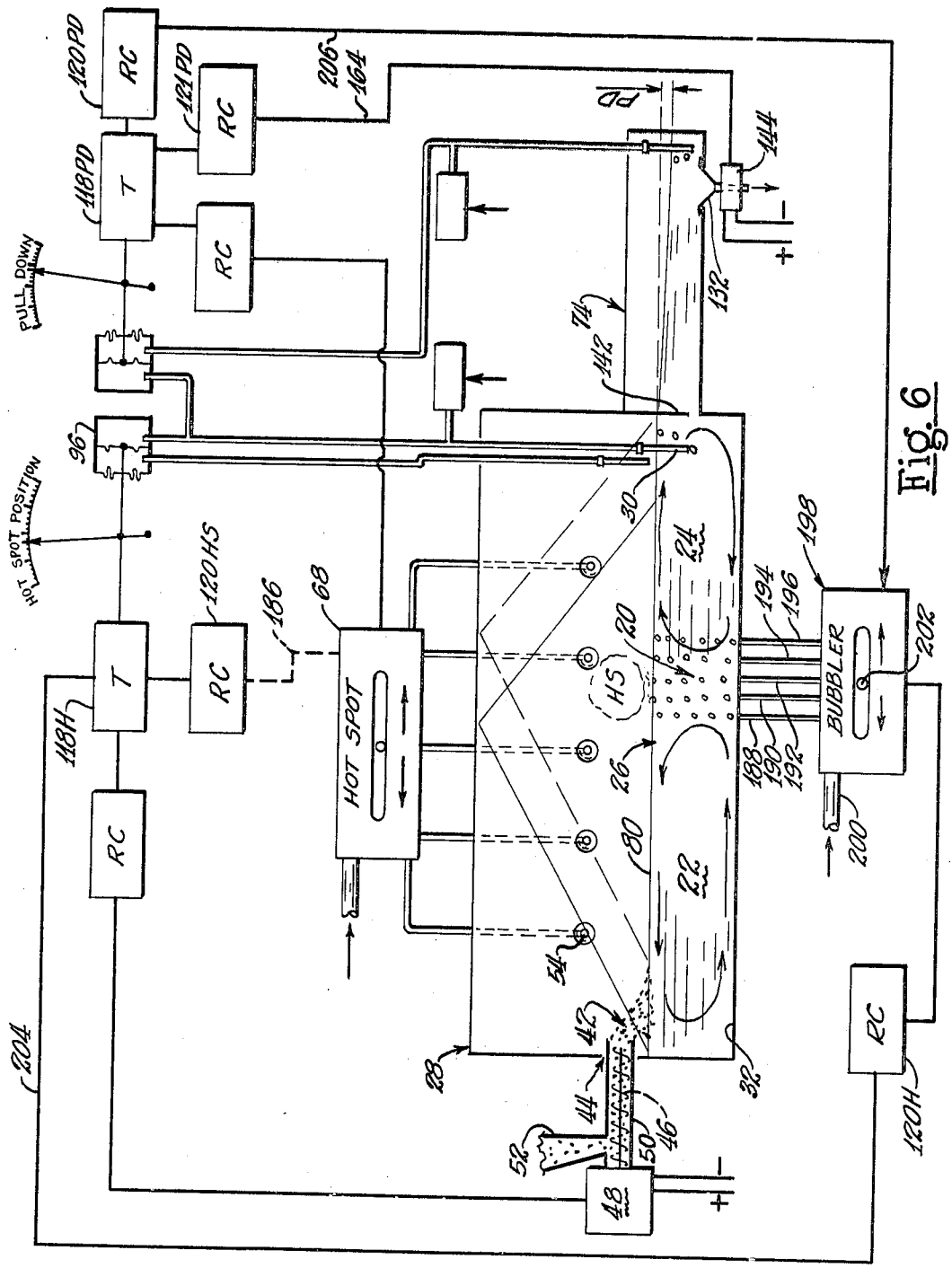

United States Patent Office 3,482,956
Patented Dec. 9, 1969

3,482,956
METHOD AND APPARATUS FOR OPERATING A GLASS MELTING FURNACE
William C. Trethewey, Newark, Ohio, assignor to Owens-Corning Fiberglas Corporation, a corporation of Delaware
Filed Jan. 21, 1966, Ser. No. 522,206
Int. Cl. C03b 5/24
U.S. Cl. 65—136                    4 Claims

ABSTRACT OF THE DISCLOSURE

Process and apparatus for operating a glass melting furnace, particularly for controlling the hot spot along the length of a furnace, based upon the level of molten glass of the furnace or the withdrawal rate from the furnace, to provide an optimum hot spot position commensurate with the instant melting conditions, by simultaneously shifting burner input and submerged bubblers.

---

This invention relates to the processing of glass and more broadly to the processing of heat-softenable materials. Further, this invention relates to the control of the hot spot in a glass melting furnace responsive to level in the furnace and/or responsive to throughput of the furnace as measured by pressure drop across the forehearth. Still further, this invention relates to the simultaneous control of the hot spot in a glass melting furnace and also the control of other factors such as temperature, viscosity, level, etc.

The problem: Manufacture of glass on a continuous basis; life of the furnace; high temperatures. In the production of molten glass it is desirable to maintain conditions within the furnace constant. A furnace represents a very large investment. In order to withstand the high temperatures employed to melt and fine the glass, and further to withstand the corrosive action of the fusion agents in a glass batch, the furnace is made of the best refractories available. Also the skilled labor required to precisely install the refractories is very costly. Thus, the longest life possible is desired from a melting furnace because teardown and rebuild are costly; and further lost production is also costly.

If the firing level and thus the temperature within the furnace could be maintained at a constant and optimum level, a substantial contribution would be provided to the art.

Glass washing action. Also it is desirable to maintain a substantially constant level in the glass melting furnace. A very important reason for doing so is to reduce the up and down washing action of the glass surface against the refractory. The washing action causes the refractory to erode and small particles from the refractory fall into the molten glass. These contaminate the glass with "stones" and produce reject products.

If this washing action could be eliminated, the life of the furnace would be substantially extended and the quality of the effluent glass would be improved simultaneously.

Thermal gradients. A further important reason for keeping the firing rate constant and at optimum efficiency is to stabilize the thermal gradients in the glass. Where firing rate is varied to accommodate changes in the volume of infeed materials, thermal gradients are produced. The thermal gradients cause non-uniform feed out of the molten glass from the furnace.

The foregoing are difficult problems to solve, in continuous production, because molten glass is being constantly removed from the furnace; and it is necessary to add glass-forming materials to compensate for the glass removed.

By the present invention improvements to the art are provided in the form of process and apparatus for precisely controlling the firing of a glass melting furnace, and as extra features, holding the level constant, and controlling other variables such as thermal gradients.

It is accordingly an important object to provide process and apparatus for controlling the hot spot in a glass melting furnace.

A further object is to simultaneously control the level in a glass melting furnace.

A further object is to provide process and apparatus for controlling bubbler operation in a glass melting furnace to establish a thermal barrier within the glass for improved operation.

On the drawings: FIGURE 1 is a schematic illustration of the present invention as appplied to control the hot spot in a glass melting furnace;

FIGURE 4 is a schematic illustration of an extension of the invention as shown in FIGURE 3 using probe means for sensing the level and thereby ascertaining pressure drop across the forehearth for hot spot control;

Figure 3:
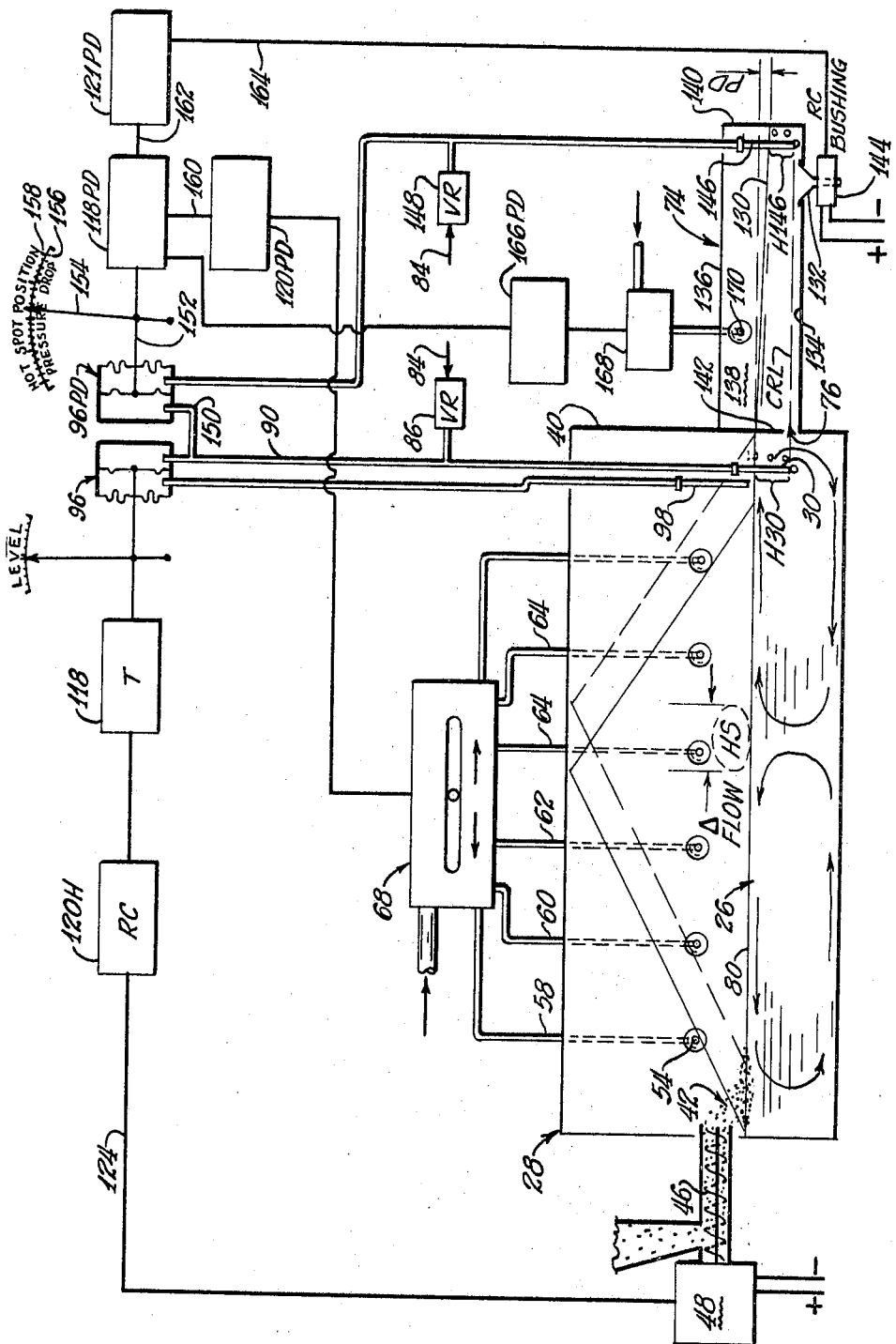
FIGURE 3 is a schematic illustration of another refinement of the invention as applied to control the hot spot in a glass melting furnace based on the throughput of the furnace.

FIGURE 5 is a schematic illustration of an extension of the invention shown in FIGURE 3 using a submerged flow rate device in the forehearth to develop a flow rate signal by which the hot spot in the melting furnace can be controlled and further by which fine adjustments of the output of the furnace can be effected; and FIGURE 6 is a schematic illustration of an application of the present invention wherein bubblers within the furnace are modulated in accordance either with the level in the glass melting furnace or the pressure drop across the forehearth, for enhanced control of the thermal barrier that exists within the body of molten glass.

It is to be understood that the invention is not limited in its application to the particular construction and arrangement of parts described, since the invention is capable of being practiced in various ways.

SHIFT OF HOT SPOT; TIME-TEMPERATURE RELATION

Figure 1:
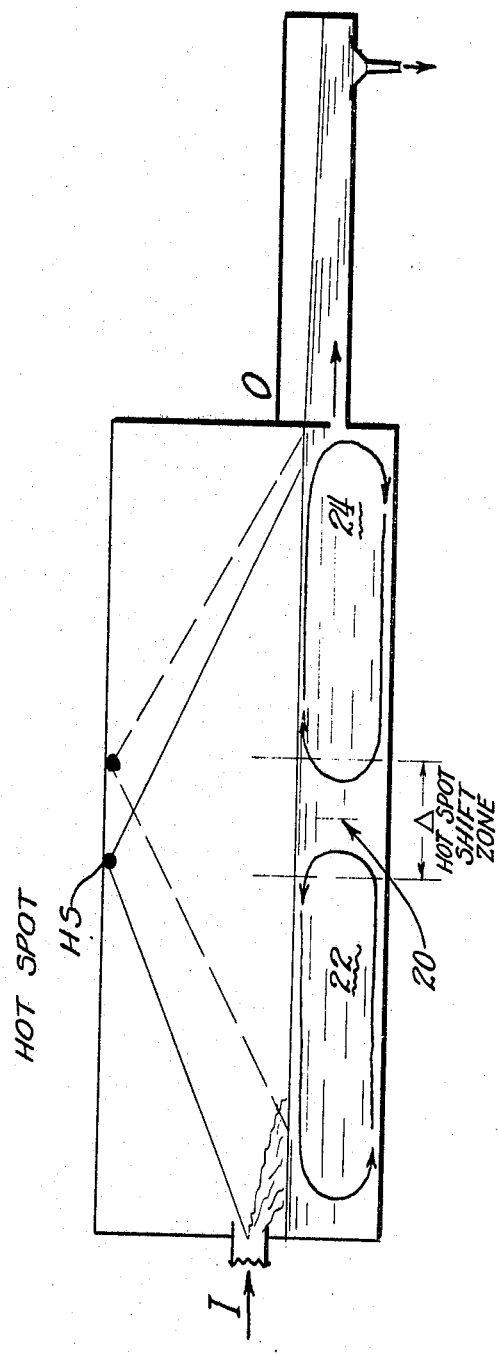

One means of utilizing the principle of constant firing relates to a time-temperature relationship of the glass-forming materials passing through a melting furnace. Thus for a given amount of material a certain time is required at a certain temperature to reduce it to a proper molten condition. Where a higher throughput is involved, a longer time will be required to bring the larger mass of material to proper temperature. Where a lower throughput is involved, a shorter time will be required. To take advantage of the time-temperature relationship, the hot spot in the furance can be shifted. Thus where the input of materials is high requiring a longer time to bring the mass to proper temperature, the shift is toward the point of introduction of the material, thus toward the inlet of the furnace in order to provide a longer time-temperature relationship. This is shown in FIGURE 1 where the hot spot is at the solid line position, that is, over toward the inlet I of the furnace. Where the input of materials is lower, requiring a shorter time to bring the mass to proper temperature, the shift is toward the outlet of the furnace. This is shown in FIGURE 1 by the dotted line where the shift is to the right toward the outlet O of the furnace. A shorter time-temperature relationship is thereby provided. By shifting the hot spot toward a certain mass, a relatively larger amount of heat is put into it; and by shifting it away from the mass a relatively smaller amount of heat is put into it.

Thus the hot spot HS causes a thermal barrier 20 to be established at some point between the inlet I and the outlet O of the furnace. The position of the hot spot HS determines the position of this thermal barrier 20. The intensity of the heat at the hot spot HS causes the glass to flow up at that point from the bottom of the furnace. The glass at the input end of the furance is comparatively cool as it is being brought up to temperature and therefore sinks to the bottom of the furnace. The upper surface flows away from the hot spot toward the cooler zones as indicated. The primary mass 22 at the input end of the furnace therefore circulates in a counterclockwise direction.

A secondary body of glass 24 is provided at the outlet end of the furnace and this is at proper, higher temperature and is being refined. This mass has a clockwise flow as shown in FIGURE 1. Thus the top flows away from the hot spot toward the cooler outlet end of the furnace where it recirculates to the bottom and back to the thermal barrier 20. This mass of glass 24 is at a relatively constant temperature; therefore the output glass is stabilized in temperature, no matter what the rate of input.

The secondary mass of glass is held at a relatively constant temperature and only the size of this mass varies, dependent upon the position of the hot spot HS and the thermal barrier 20. Also, when the primary body of glass 22 changes in size, a commensurate amount of heat is applied. This provides a time-temperature relationship in the primary body of glass 22 sufficient to bring it up to temperature and thereby establish the secondary body 24 and maintain the secondary body at relatively stable temperature.

Thus the firing rate of the furnace can be optimized for extended refractory life. Variations in the throughput of the furnace are compensated for by the position of the hot spot HS, the thermal barrier 20, and the relative sizes of the primary and secondary masses 22 and 24 of contra-circulating glass.

Greatly improved furnace operation is provided over the old system of only raising and lowering the general firing level commensurate with the throughput of the furnace.

Shifting hot spot is a good system and in accordance with the present invention this can be done manually. Further, the present invention provides a substantial advancement to the art by providing a control signal which relates the position of the hot spot to an operating factor of the furnace. As developed hereinbelow, these can include glass melter level and throughput rate.

By this invention the hot spot is located with computer accuracy by modulating heat energy input along the length of the furnace.

THE EMBODIMENT OF FIGURE 2; SHIFTING HOT SPOT BASED ON GLASS LEVEL

In this embodiment of the invention the position of the hot spot is related to the level of the body of molten glass 26 in the glass melting furnace 28. In its broadest aspect it does not matter how the level is sensed. Thus a physical contact probe, an electrical contact probe or a pneumatic sensing device can be used. The sensing device is of course referenced and thus variations from the reference call for an appropriate shift of the hot spot. As mentioned above, the broad aspects of the invention also include manual control.

A highly accurate system for sensing the level of the molten glass 26 is an immersed bubbler probe 30. This operates on the principle that the back pressure of a gas bubbled into a liquid through the submerged outlet of a probe tube is sensitive to head. To provide such head sensitivity, it has been found that the rate of flow of the gas must be maintained within a selected range. It has been discovered that within the selected flow rate range the back pressure is highly sensitive to head but substantially insensitive to viscosity. Therefore, the back pressure can be converted into a pure head or level signal.

It has been found that at an immersion depth in the range from about 1" to about 2" with a ¼" O.D. tube of .02" wall diameter, a bubble rate within the range from about 10 to about 30 bubbles per minute provides a highly accurate head signal in molten glass. This signal can be used to produce functions of hot spot control as will become apparent hereinafter. It has been found that such bubblers are sensitive to .0001" on a practical basis in commercial glass melting operations, as in a 100 or more or less ton melting furnace.

The bubbles are issued in discrete form, that is, of a maximum diameter slightly less than the probe tip to surface distance, so that they do not bridge from the probe outlet to the surface and give a false signal. Signal generation therefore is continual, e.g., as a succession of intermittent pulses.

Bubbles of this diameter are formed as the result of the relationship of viscosity of the glass, the small size of the probe, and the low pressure at which the gas is supplied to the probe. The gas is passed through the probe from a constant volumetric flow device at constant flow but at pressures commensurate with the head of liquid above the submerged end of the probe.

APPLICATION TO THE GLASS MELTING FURNACE

The furnace 28 includes refractory floor 32, roof arch 34, side walls 36, and end walls 38 and 40. The furnace 28 contains a pool of molten glass 26. The pool 26 is formed by feeding blended batch materials 42 in through an opening 44 in the left hand end wall 38. A feeder 46, powered by a variable speed drive 48 supplied with power through lines as indicated, propels the blended batch materials 42 into the furnace 28. The feeder 46 operates within a housing 50 into which batch materials are fed from a hopper 52. The housing 50 extends into the opening 44. Actuation of the feeder 46 in response to a suitable signal, developed as will be described, causes the powdered batch material 42 to be fed into the pool of molten glass 26 at an appropriate rate in accordance with the demands of the furnace.

The atmosphere above the pool of molten glass 26 is suitably gas or oil fired. Alternately electricity can be used, by means of submerged electrodes, not shown. A series of burners 54 are inserted through ports 56 to project flames laterally across the pool 26, preferably at an optimum firing rate to melt the blended input batch materials 42. Burners 54 are supplied with fuel via pipes 58, 60, 62, 64, 66 as necessary along the length of the furnace. The pipes 58, etc., are in turn connected to a firing regulator 68 of the linearly modulating, but substantially constant flow type. Primary fuel is introduced into the regulator 68 through a main inlet pipe 70.

In the regulator 68 the fuel is manifolded out through the pipes 58, 60, 62, 64, and 66 to the burners 54 as determined by the position of the movable modulator indicator 72, in turn set by the signal. The hot spot is established as necessary in a particular furnace for a given operation.

The furnace 28 is illustrated as having a forehearth 74 at the right hand end. The right hand end wall 40 is provided with an opening 76 that connects into the forehearth 74. An outlet instrumentality 78 is shown to illustrate glass flow from left to right through the furnace.

The present invention is broadly applicable to shifting the hot spot commensurate with level in the melter or in the furnace. For this purpose the modulator knob 72 can be adjusted by hand as well as by a controller.

REFINED APPLICATION

In this more refined version of the invention the hot spot HS is shifted, based on the level 80 of the body of molten glass 26.

At the right hand end of the furnace 28 the roof arch 34 is provided with a small opening 82. The bubbler probe 30, in the form of a high temperature resistant metal tube is extended down through the opening 82 and projects vertically downwardly into the body of molten glass 26 with the open end immersed below the surface 80. The probe 30 is fixed in space so that the glass level 80 moves relative to it.

The probe 30 is supplied with a constant volumetric flow of gas such as air, carbon dioxide or other at a suitable rate to sense the head of glass in accordance with the principles previously established. For this purpose a supply pipe 84 carrying gas from a suitable pressure regulator, not shown, feeds into a constant volumetric flow regulator 86. A branch pipe 88 conducts the gas to the main bubbler probe tube 90 to which the bubbler probe 30 is connected. The gas bubbles out of the submerged end of the probe 30 as discrete bubbles 31.

The probe tube 90 is suitably connected to a surge tank 92 where back pressure pulses from bubble formation are partially attenuated. In actual practice the volume of the line can be used. A restrictor 94 is also suitably connected to the probe tube 90 for further blip attenuation. From the restrictor 94 the gas passes into one side of a differential pressure detector cell 96.

Depending on firing conditions, the atmosphere above the pool of molten glass 26 may be practically subjected to mild pressure fluctuations. Therefore, an atmospheric sensing probe 98 of high temperature resistant metal is inserted through the opening 82 of the roof arch 34 alongside the bubbler probe 30. The atmosphere probe 98 is connected into the other side of the differential pressure detector cell 96 by means of a tube 100. A restrictor 94 can be used if the system requires such for attenuation purposes.

THE DIFFERENTIAL PRESSURE DETECTOR CELL

The cell 96 comprises a closed housing 102 having a movable diaphragm 104 supported between flanges 106. The diaphragm 104 and the support flanges 106 are secured to one another in gas-tight relationship, and the flanges are also secured to the housing 102 in gas-tight relationship. This divides the housing into two isolated compartments. The different pressures imposed on the diaphragm provide a differential signal.

A signal pick-up arm 108 is connected at one end to the movable diaphragm 104 and extends out of the housing 102 through a flexible cover 110 in gas-tight relation. The pick-up arm 108 can be connected with a visible indicator needle 112 that moves relative to a level scale 114; this can be extrapolated to a hot spot position scale 116. Additionally, the signal pick-up arm 108 is connected to a transducer 118 to amplify the head signal from the cell 96 for hot spot control purposes.

The pressure required to form a bubble at the probe tip 30 is sensed by the cell 96 on one side of the diaphragm 104. Furnace pressure is also sensed by the cell through probe 98 on the other side of the diaphragm. Since bubble pressure equals head of glass above the tip of probe 30 plus the furnace atmosphere pressure, the head of glass equals bubble pressure minus atmosphere. Note that bubble pressure opposes atmosphere on the diaphragm so that the net displacement of the diaphragm (the output of the cell 96) equals bubble pressure minus atmosphere or H the desired level measurement. This arrangement automatically compensates the system for any internal furnace pressure fluctuations, thus avoiding an upset in the level system if for any reason furnace pressure should suffer a disturbance.

THE UNEXPECTED RESULT

By the arrangement shown, the head or level and hot spot position can be observed visually for the convenience of an operator. Further, the hot spot can be controlled with computer accuracy. To complete the control loop, the transducer 118 is connected to a recorder controller 120H by line 122.

LEVEL CONTROL

For level control purposes the recorder controller 120H is connected to the variable speed drive means 48 for the feeder 46. This connection is made by line 124. As the glass level 80 fluctuates from furnace drawdown, the bubbler probe 30 will sense the change and the result will be an instantaneous signal through the differential pressure detector cell 96 and the loop including the transducer 118 to the feeder 46. Variations of the level 80 will be smoothed out and the level retained substantially constant for improved furnace operation at a given throughput. Thus the hot spot will automatically be adjusted to given furnace throughput.

HOT SPOT SHIFT

It has been stated above that the broader aspects of the invention involve the manual setting of the hot spot, and in view of the immediately foregoing description, simultaneous stabilization of the level along with manual hot spot adjustment are within the scope of the invention.

In a refinement provided by the invention, however, the hot spot position is interlocked with the level 80 in the melter 28 to provide computer accurate control. For this purpose line 126 connects the transducer 118 into a recorder controller 120HS (hot spot). The recorder controller 120HS is connected to the modulating firing regulator 68 by line 128. By this arrangement the hot spot HS will be incrementally positioned along the length of the furnace at an illustrative position within the hot spot shift zone commensurate with the level signals from the bubbler probe 30.

Thus in the total scope of the invention, batch materials 42 are fed into the glass melting furnace 28 by means of a feeder 46 on call from the bubbler probe 30. Further, the hot spot HS is accurately positioned along the length of the furnace. Thus level and hot spot both are accurately interlocked for stabilized furnace operation. A drop in the level 80 of the molten glass 26 will cause the bubbler probe 30 to produce a demand for higher input of batch material 42. Simultaneously the hot spot will be shifted toward the inlet end of the furnace to provide greater heat input to the primary mass of glass 22 for an appropriate time-temperature relationship in the resultant enlarged primary body. The heat will therefore be slightly reduced on the secondary body of glass 24 which has grown smaller in size and requires less heat to retain it at an appropriate level. A smaller drawdown on the furnace 28 will produce the opposite shift. In such case the secondary body of glass 24 will grow larger in size requiring slightly greater heat for maintaining it at constant temperature. Less heat will be required for the melting because of the smaller size of the body 22 and thus conditions are automatically taken care of by the hot spot shift, but without change of total heat input. Changes in throughput are therefore absorbed in the system by hot spot shift at a retained optimum firing level.

Figure 2:
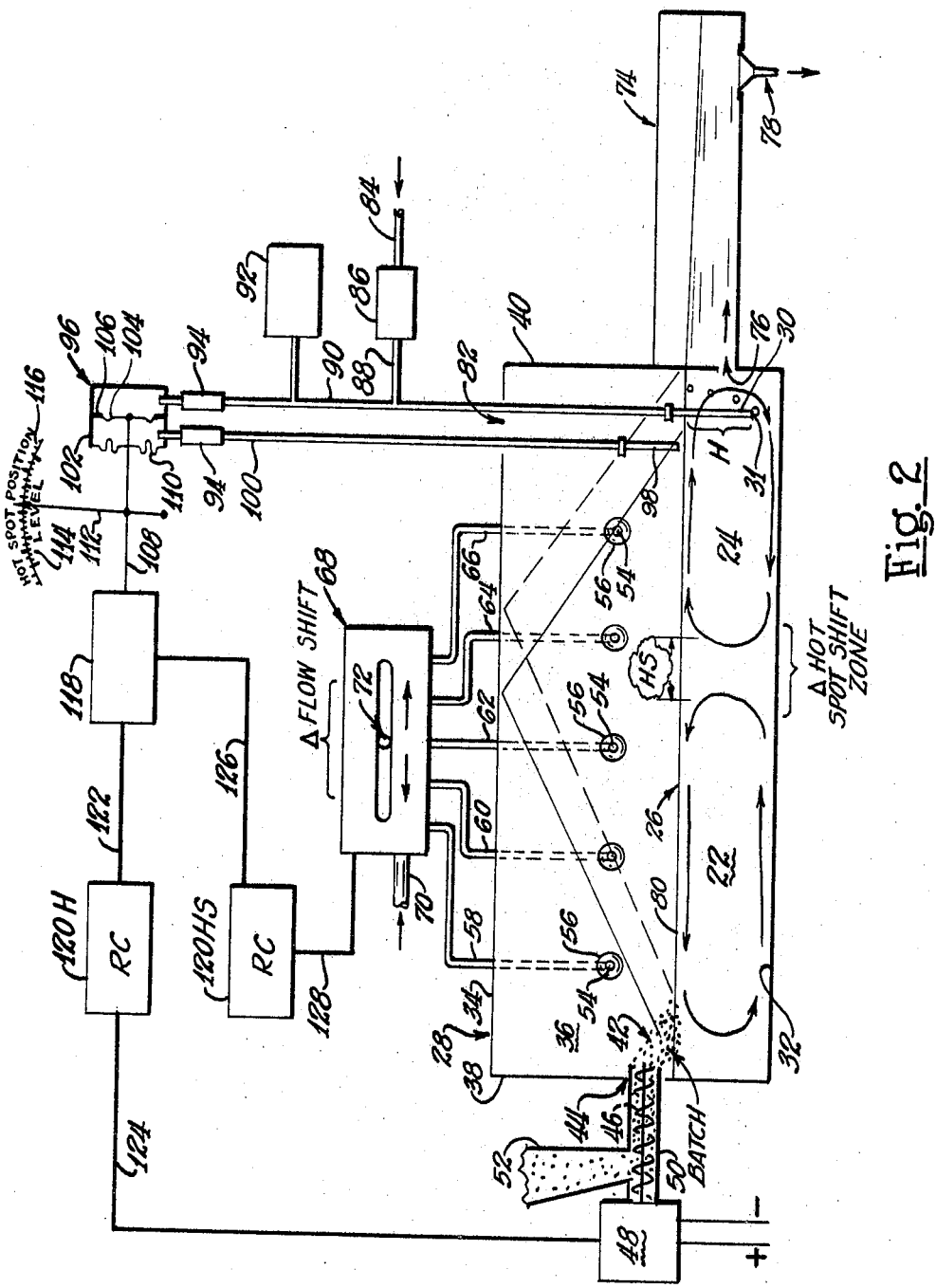
FIGURE 2 is a schematic illustration of a first refined aspect of the present invention as applied to control the hot spot in a glass melting furnace based on the level of the molten glass.

In view of the foregoing the following aspects of the invention are encompassed within the disclosure of FIGURE 2.

(1) Broadly shifting the hot spot, either manually or by a control signal.

(2) Controlling level and manually shifting the hot spot.

(3) Controlling the hot spot based on level.

(4) Simultaneously interlocking both hot spot and level control for greatly improved furnace operation.

In the extended scope of the invention a mechanical, electrical or pneumatic device can be used to sense the surface of the molten glass 26. The bubbler probe 30 however has proven to be highly accurate and practically dependable and operable.

HOT SPOT SHIFT BASED ON FLOW; FIGURE 3

In this embodiment of the invention, even greater refinement of the overall process of melting glass is provided. Here the following factors are governed for stabilized throughput of a glass melting furnace: (1) Hot spot; (2) level; and (3) furnace throughput.

In this very practical aspect of the invention, the pressure drop across the forehearth 74 of the furnace 28 is measured by determining the differential between the level 80 of the body of molten glass 26 within the furnace and the level 130 at the outlet of the forehearth 74. In other words, control of the hot spot HS is cross-coupled with the flow rate of the glass out of the forehearth 74. Thus control outside the furnace itself is provided for extending accuracy to a system utilizing a furnace and associated instrumentalities.

As shown, molten glass flows from the furnace 28 through the forehearth 74 as a shallow layer, for delivery to a forming instrumentality. In this particular application of the invention, the forehearth 74 is equipped with a delivery bushing 132 for production of wool fibers, using a jet of high pressure gas, not shown. Other outfeed instrumentalities as will be evident to the skilled artisan can be utilized and controlled however.

The batch ingredients 42 are introduced by a feeder 46 as in FIGURE 2. At this point it should be stated that the viscosity of the melt will vary at least slightly in accordance with known experience in the art. This depends upon the ingredient infeed, thermal characteristics of the furnace and the like. However, by the present invention minor viscosity changes are taken care of at the bushing 132 by varying the heat of the bushing or the heat of the forehearth 74 for fine control of the process.

The right hand end wall 40 of the furnace 28 is provided with an opening 76 that connects into the forehearth 74 for appropriate glass flow. The forehearth 74 is essentially an elongated open top channel and includes refractory floor 134, roof arch 136, side walls 138 and end wall 140. Although the top appears to be closed by the roof arch 136, the forehearth 74 is usually adequately vented so that a relatively quiescent atmosphere exists there as compared to the more intense atmosphere of the melting furnace 28. Accordingly for practical purposes, the atmosphere of the forehearth 74 need not be taken into account in the present system.

A strainer block 142 is positioned in the mouth of the forehearth to hold back any floating particles from the effluent molten glass. The strainer block 142 also effectively separates the atmosphere of furnace 28 from the atmosphere of the forehearth 74.

The flow of molten glass across the length of the forehearth 74 is effected by gravity and the pressure drop PD is illustrated by the slant of the line 130 designating the surface of the flowing glass. This is shown exaggerated for purposes of more clearly illustrating the invention. Practically a pressure drop across the forehearth may be in the nature of ½ to 1½″.

The bushing 132 is suitably of circular configuration and can be made of high temperature resistant metal to withstand the molten glass. For purposes of the present illustration, the bushing 132 is shown as having a heater 144 positioned around it. The heater 144 is electrically powered as illustrated. By this arrangement the bushing 132 has a fixed feed orifice. However by means of the heater 144 the viscosity of glass flowing through the bushing can be reduced by actuating the heater so that flow control is provided in the nature of a variable valve.

THE FLOW DETECTOR SYSTEM

A bubbler probe 30 is introduced into the outlet end of the glass melting furnace 28, the same as in FIGURE 2, with the outlet immersed to a common reference level CRL. This probe is connected into one side of a differential pressure detector cell 96 by a tube 90. The blip attenuation equipment is not shown to avoid repetition of FIGURE 2. Gas is supplied to the bubbler probe 30 by pipe 84 and constant volumetric flow controller 86 to sense the head of the glass, to wit, the position of the surface 80. The atmosphere probe 98 is connected into the other side of the differential pressure detector cell 96. This is effective to remove the atmosphere from the head signal. The control loop from the cell 96 to the variable feeder mechanism 48 is as previously described, including a transducer 118 and a recorder controller 120H.

THE FOREHEARTH PROBE

The forehearth probe tube 146 also is of high temperature-resistant metal. This is immersed to the common reference level CRL. The differential back pressure between the probes 30 and 146 indicates the pressure drop PD across the forehearth 74. The depth of the probe 30 is H30 and that of probe 146 is H146. H30 minus H146 equals pressure drop PD.

Probe 146 is fixed in space and supplied with gas at a pressure to meet all conditions by a constant volumetric flow controller 148 and inlet pipe 84. The back pressure on this gas will vary with the head H146 at the outlet of the forehearth 74. Suitable signal attenuation equipment can be used as in FIGURE 2. The forehearth probe 146 is connected into one side of a differential pressure detector cell 96PD. The other side of the cell 96PD receives the head signal from the glass melting furnace 28 via the tube 150.

A pressure drop signal arm 152 extends out of the cell 96PD and can engage a pressure drop indicator needle 154 that moves relative to a pressure drop scale 156 that can be extrapolated to a hot spot position scale 158. The signal arm 152 is also connected to a transducer 118PD, in turn connected to a recorder controller 120PD by line 160. The recorder controller 120PD is connected to the modulating valve or firing regulator 68 for hot spot control. Additionally, the transducer 118PD is connected to a recorder controller 121PD by line 162. The recorder controller 121PD is connected to the bushing heater 144 by means of line 164.

OPERATION

The head signal from the probe 30 in the glass melting furnace 28 controls the rate of input to the furnace commensurate with the level 80. The signal goes around the loop from probe 30 to the variable rate drive 48 for the feeder 46. Simultaneously, the pressure drop PD across the forehearth 74 modulates the hot spot HS along the length of the melting furnace 28, commensurate with the flow through the forehearth. Two important conditions, namely level and hot spot are thus brought under control and interlocked for highly practical operation.

Still further, the pressure drop signal causes the controller 121PD to adjust the temperature of the bushing heater 144 and thus levels out the flow through the bushing since the viscosity of the glass is temperature-sensitive and fine adjustments are thereby made at the bushing.

EXTENDED SCOPE

In this embodiment of the invention the bushing temperature and/or the temperature of the forehearth 74 can be varied commensurate with the viscosity of the glass. Thus a third recorder controller 166PD can be connected to the transducer 118PD. A burner control 168 is connected to vary the flow of fuel to the forehearth burner 170. The pressure drop signal from the transducer 118PD can thus be used to direct the firing of the forehearth if desired, in addition to the fine control provided by the bushing heater 144.

As mentioned above, the change in temperature of the bushing 132 causes it to function in the nature of a variable valve. Therefore, within the scope of the invention it is to be understood that the bushing 132 can be built as a variable orifice mechanism and the controller 121PD will function to vary the orifice commensurate with the viscosity of the glass as dictated by the pressure drop signal.

Further, instead of being placed in the melting furnace, the probe 30 can be placed somewhere in the forehearth 74. Substantially any arrangement can be sued so long as a pressure drop signal is sensed and converted to a function.

Further, the foregoing embodiment of the invention is not limited to the processing of glass. Thus, heat-softenable materials such as steel, etc. can be processed on a continuous basis in accordance with the principles set down regarding the embodiment of FIGURE 3.

Further, in this aspect of controlling hot spot based on pressure drop or flow, the invention is not to be limited to bubbler probes. Thus any pressure drop detecting means can be employed, so long as level of glass and hot spot shift are interrelated. This could include two mechanical probes substituted for the probes 30 and 146, to sense the two different levels of the glass. Also it could include two electrical contact probes or two gas emitting probes that move up and down toward the surface in walking beam fashion and detect the surface. Some examples of this logical extension of the invention are shown in FIGURES 4 and 5.

SURFACE PROBES

Thus a first detector 172 would pick up the high side signal, that is the level of the liquid on the high side of the restriction (forehearth). A second detector 174 would pick up the low side signal. In accordance with this aspect of the invention, signal attenuation means of appropriate design could be utilized. A differential level detector cell 176 is utilized to arrive at a pressure drop signal. By connection with a transducer 118, the system could function as described in any one of the ways shown in FIGURE 3.

FLOW RATE BUBBLER AS HOT SPOT CONTROL

Still further, a flow rate bubbler as shown in FIGURE 5 can be utilized in the system of the present invention for hot spot control. This is based on the discovery that flow of a liquid will produce a pressure differential between oppositely facing probes immersed in the flowing liquid. A first probe 178 has its outlet facing upstream to the flow direction 180 of the molten glass 182 in the forehearth 74. A second probe tube 184 has its outlet facing downstream. Each probe tube has the outlet at the same common reference level CRL.

Separate but equal constant flow volumes of gas are respectively moved through each probe 178 and 184. The gas is passed through the probes from separate constant volumetric flow devices provided for each probe. The gas issues from each probe as a series of discrete bubbles that do not bridge to the surface. The back pressure imposed on each probe will vary in accordance with any variation in the head of liquid above the submerged outlets of the probes. However, this will have no effect because both outlets are at the same common reference level CRL. Thus head and atmosphere above the liquid are balanced out of the system as constants. Signal attenuation equipment for the blips produced by bubble formation can be utilized as described herein.

The explanation of the principle on which the probes of FIGURE 5 operate is that the probe 178 which has its outlet facing upstream to the direction of flow will encounter a greater back pressure caused by the tendency of the flowing glass to enter. The probe 184 will encounter a slightly lesser back pressure as the flowing glass tends to pull the gas from the outlet as it flows past. The resultant pressure differential is a direct measure of flow rate.

With the same constant volumetric flow of gas through each probe 178 and 184 a pressure differential will be produced that is a positive and accurate measure of the rate of flow of the molten glass 182 in the direction 180, that is across the forehearth 74. The signal is developed by balancing the two back pressures against a movable diaphragm in a differential pressure detector cell of the nature of 96 in FIGURE 3. The signal can be transduced and fed into the hot spot modulating control 68 shown in FIGURE 3. Or, the signal can also be used to control the heat of the bushing 132 in FIGURE 3, or to control the heat of the forehearth as previously discussed.

If desired, the signal from the probes of FIGURE 5, or from FIGURE 4 can be extrapolated into flow volume by using known constants of temperature, viscosity of the glass, cross sectional area of the forehearth, etc. so that the throughput of the system can be reproduced visually and recorded if desired.

In this aspect of the invention or in FIGURE 4, the head bubbler probe 30 in FIGURE 3 can be retained for level control in the glass melting furnace 28.

In this bubbler flow rate measurement aspect of the invention of FIGURE 5 the bubble rate is not considered limiting within the realm of discrete bubbling. In actual runs 15 to 30 bubbles per minute have worked extremely well. Further, within the scope of the invention from 1 to 150 bubbles per minute can be used.

FURNACE BUBBLERS IN HOT SPOT CONTROL; FIGURE 6

In this embodiment of the invention further refinements are provided for the melting of glass. Here, in addition to shift of hot spot and level control, a control for melting furnace bubblers is provided. In the extended scope of the invention, this can be interlocked with the following: (1) Melter level; or (2) pressure drop across the forehearth.

As shown, the melter level 80 is controlled by a signal from a bubbler probe 30 immersed in the body of molten glass 26. The signal directs the variable feeder as discussed above. Alternately the hot spot modulator instrument 68 can be directed in its function by the signal from the bubbler probe 30 by a connection represented by the dotted line 186 in turn connected to a transducer 118 through a recorder-controller 120HS which receives its signal from the differential pressure detector cell 96.

The further control feature to be emphasized here relates to a series of tank bubblers 188, 190, 192, 194 and 196. These can be controlled either by the level signal produced from the probe 30 or by a pressure drop signal developed across the forehearth 74. These bubblers 188, etc. are effectively utilized to control the position of the thermal barrier 20 in coordination with the position of the hot spot HS.

Each bubbler 188, etc. comprises a tubular conduit inserted through the refractory floor 32 of the glass melting furnace 28. Gas under suitable pressure is supplied to the bubblers from a bubble modulator 198. Primary gas is introduced into the modulator 198 through a main supply pipe 200. In the modulator 198 the gas is manifolded out to the bubblers 188, 190, 192, 194, 196 as determined by the position of the movable modulator indicator 202, commensurate with the needs of the melting furnace 28 as governed by the signal produced either by the furnace level 80 or by the pressure drop PD across the forehearth 74.

For operation by means of a glass melting furnace level signal, a connecting line 204 is run from the transducer 118 to recorder controller 120H (head) for the bubbler modulator 198. It will be evident that level 80 in the glass melting furnace 28 can thus control the bubbler modulator. Additionally, it will be evident in accordance with the principles developed relative to FIGURE 3 that level is also controlled by the probe 30 as is the position of the hot spot. An interlocking system is thereby provided for a unitized operation.

Alternately a recorder-controller 120PD can be coupled to the transducer 118PD (pressure drop) and the pressure drop signal sent through a connecting line 206 to the bubbler modulator 198.

It is within the scope of the invention to adjust the bubbler modulator 198 manually dependent on the needs of either throughput or level or otherwise of the furnace.

In an extended refinement of the invention the bushing 132 can be controlled by a loop from the transducer 118PD including a connecting line 164 and a recorder-controller 121PD to the bushing heater 144.

It is to be understood that the wording of the present disclosure is broad where it states that the measured head or measured pressure drop can be transduced to produce a control function.

CONVECTION CURRENTS AND PATTERNS IN A GLASS MELTING FURNACE

FIGURE 6 illustrates the convection flow paths of the molten glass 26 and further illustrates the application of the invention to control of the convection patterns in the glass.

The powdered batch materials 42 are fed into the furnace 28 through the opening 44 at the left side. The raw batch is gradually reduced to a molten state by the heat of the furnace. As the glass progressively melts, it establishes a primary body of glass 22 of counterclockwise circulation between the infeed end of the furnace and the bubblers 188, etc. The gas delivered from the bubblers 188, 190, 192, 194 and 196 agitates and accelerates the flow of the glass in the counterclockwise direction and this movement permits more rapid melting of the batch as well as assisting the mixing of the freshly molten glass to render it homogeneous.

The hot spot HS of the furnace and the thermal barrier 20 are developed by the modulation of the burners 54 and the bubblers 188, etc. This thermal barrier 20 or "thermal dam" effects the transition of the glass from the melting to the refining stages of the process.

The establishment of temperature differentials in the body of molten glass 22 sets up paths of flow by convection. In the primary body of glass 22 the upper layer or region flows away from the hot spot HS toward zones of lower temperature. Thus the flow is toward the input end of the furnace. The upper surface of the glass in the secondary body of glass 24 flows away from the hot spot in a right hand direction or clockwise manner toward the outlet end of the furnace. The bubblers 188, etc. influence the position of the thermal barrier by lifting the cooler molten glass from the refractory floor 32 to the upper hot zones.

During the convection circulation, fining of the glass takes place so that the glass is gradually rendered more homogeneous and of improved quality.

As the molten glass continuously flows out of the glass melting furnace 28, there is a lowering of the level of the molten glass at the outlet end of the furnace which produces an overall progressive movement of the molten glass across the thermal barrier 20, modified by the convection currents of the glass during the melting and fining stages.

While the paths in the various zones of the molten glass illustrated in FIGURE 6 have been shown and described as moving lengthwise of the furnace, it is to be understood that similar flow paths of the glass are existent in angular and transverse directions with respect to the central region of the furnace due to convection flow resulting from temperature gradients from the hot central zone to the zones of lower temperature near the side walls.

As the heat from the burners 54 in each side wall of the furnace moves toward the longitudinal center zone throughout substantially the entire length, there is a central region of increased temperature lengthwise of the furnace which fosters convection movements of the glass transversely and angularly as the hottest glass at the surface moves toward the furnace side walls from the central zone and the cooler glass near the floor moves in the opposite direction toward the central hotter zones. This type of convection flow tends to offset minor temperature variations which may tend to be set up in corners or isolated regions of the furnace so that the tendency for any chilled isolated regions to be formed is substantially eliminated. It is advisable to keep the temperature of the glass relatively high. This reduces the viscosity and enhances convection flow and fining of the glass by the removal of occluded gases.

Processing in accordance with the present invention provides a time-temperature balance in the furnace which eliminates surging temperatures which would effect the condition of the melt. The present process therefore provides dynamic constancy of all factors under which the glass is continuously processed.

TRANSVERSE ORIENTATION OF THE HOT SPOT AND BUBBLER PIPES

Within the scope of the invention the hot spot and the thermal barrier 20 can extend transversely of the melting furnace or can be slanted or skewed relative to the longitudinal axis of the furnace.

PRACTICAL ASPECTS

In a practical embodiment of the invention, the probe tubes comprised high temperature-resistant metal of about ¼" O.D. and having .02" wall thickness, with immersion depths of 1 to 2" and bubble rates in the range of about 10 to 30 bubbles per minute. The size and wall thickness of the tubes however is not to be limited. Thus a probe of ⅛" O.D. with .02" wall thickness could be used. Further a ⅜" O.D. tube can be used. Variations can be made depending upon the particular installation conditions.

Probe immersion depths of 1 to 2" demonstrate the versatility of the invention for measuring shallow depth flow conditions as in the forehearth of a glass melting furnace. However measurements in deeper zones can be made with a high degree of accuracy. Thus deeper immersion depths also make it possible to apply the invention to deeper measurement as for the production of steel or other heat-softenable materials.

When other liquids of substantially differing viscosity from glass are being processed, bubble rates applicable to the measurement will be apparent through practical studies.

In its broadest aspect the present concept is applicable to a single bubble developed at the end of the level probe. This is based on the fact that at a given depth a given pressure will be required to produce a bubble. If a bubble of constant size is maintained, the back pressure will vary dependent on head. Also the bubble can vary in size if the back pressure is held constant. The size of the bubble can be measured and correlated to head. The measuring device could be mechanical, electrical, optical or other.

The invention provides an ideal medium for developing a signal to be fed into a direct digital computer controller for regulation of variables in a glass melting or analogous heat-softenable material processing operation including furnace temperature control, level control, throughput control, hot spot and thermal barrier control and others. These factors are thus stabilized as substantial constants for highest quality output at optimum production efficiencies.

Inherent in the process is also the establishment of a selected setting or position of the hot spot, level, thermal barrier and other conditions. Thus the indicator needles can be moved to a selected setting and held until the associated mechanism causes the system to stabilize at those levels.

The invention is particularly applicable to the processing of glass and is more broadly applicable to the processing of heat-softenable materials including steel, heat-softenable synthetic resins, etc. In short any processing operation for liquid materials would be encompassed where a hot spot is utilized in conjunction with a thermal barrier gradient in a convection flow system.

The control loop shown in the drawings extending from the differential pressure detector cells through the transducers and recorder-controllers can be electrical or pneumatic within the scope of the invention. The recorder-controllers can be combination unit as shown or may take the form of two separate units.

I claim:

1. In a process of operating a glass melting furnace, the steps of adding glass forming materials into one end of a radiant energy heated furnace, directing radiant energy into said glass forming materials at a series of locations along the length of the furnace of an intensity to melt the materials and form a body of molten glass within the furnace, sensing the level of the molten glass to provide a signal, forming a hot spot of radiant energy between the ends of the body of molten glass to produce primary and secondary contra circulating masses within the molten body, separated by a thermal barrier zone, bubbling gas up through the molten glass in said thermal barrier zone thus providing a separation between said primary and secondary contracirculating masses and retaining the glass in the primary mass for a time sufficient to bring it up to a temperature near that of the secondary mass before passing it into said secondary mass, and maintaining the secondary mass at relatively stable temperature for outflow from the furnace, removing molten glass from the furnace from said secondary mass, adding additional glass forming materials to maintain the level substantially constant in accordance with said signal, and shifting said hot spot by modulating the radiant energy input along said series of locations, and said bubbling gas longtitudinally of the furnace to shift said thermal barrier toward and away from the input end of the furnace based on said level signal.

2. In apparatus for operating a glass melting furnace having an input end, a melting chamber, an output end, a forehearth connected to the output end, and means for removing molten glass from the forehearth, feed means for feeding glass forming materials into the input end of the furnace, heating means positioned along the length of the melting chamber between the input and output ends for producing heat energy for melting the glass forming materials to form a body of molten glass within the melting chamber, shiftable control means for said heating means including adjustable input means for each heating means to modulate the energy output of each heating means to produce a hot spot between the ends of the furnace, with the hot spot being effective to produce primary and secondary contracirculating masses within the molten body, separated by a thermal barrier, means for actuating said heat control means, means for shifting said control means to shift the hot spot longitudinally of the furnace, level sensing means for sensing the level of the molten body to produce a signal, means connecting said level sensing means and said feeding means whereby addition of glass forming materials to the furnace is based on said level signal to thereby maintain the level substantially constant, pressure drop sensing means for sensing the pressure drop of molten glass flowing across said forehearth to produce a signal representing throughput, and means connecting said pressure drop sensing means and said heat control means for shifting said control means and thus said hot spot in response to the throughput signal.

3. In apparatus for operating a glass melting furnace having an input end, a melting chamber, and an output end, feed means for feeding glass forming materials into the input end of the furnace, means for removing molten glass from the output end, heating means positioned along the length of the melting chamber between the input and output ends for producing heat energy for melting the glass forming materials to form a body of molten glass within the melting chamber, shiftable control means for said heating means including adjustable input means for each heating means to modulate the energy output from each heating means to produce a hot spot between the ends of the furnace, with the hot spot being effective to produce primary and secondary contracirculating masses within the molten body, separated by a thermal barrier, means for actuating said heat control means, means for shifting said control means to shift the hot spot longitudinally of the furnace, gas bubbler means positioned along the length of the melting chamber for introducing bubbles of gas upwardly through the molten glass to enhance said thermal barrier and produce the primary and secondary masses within the molten glass, the gas bubbling and thermal barrier being shiftable longitudinally of the furnace, control means for each said gas bubbler means to modulate the gas input to shift said bubbling and thus said thermal barrier longitudinally of the furnace, level sensing means sensing the level of the molten body to produce a signal, and means connecting said level sensing means and said bubbler control means for shifting said bubbling and thus said thermal barrier in response to said level signal.

4. In apparatus for operating a glass melting furnace having an input end, a melting chamber, an output end, a forehearth connected to the output end, and means for removing molten glass from the forehearth, feed means for feeding glass forming materials into the input end of the furnace, heating means positioned along the length of the melting chamber between the input and output ends for producing heat energy for melting the glass forming materials to form a body of molten glass within the melting chamber, shiftable control means for said heating means including adjustable input means for each heating means to modulate the energy output of each heating means to produce a hot spot between the ends of the furnace, with the hot spot being effective to produce primary and secondary contracirculating masses within the molten body, separated by a thermal barrier, means for actuating said shiftable heat control means, means for shifting said control means to shift the hot spot longitudinally of the furnace, gas bubbler means positioned along the length of the melting chamber for bubbling gas upwardly through the molten glass to enhance said thermal barrier and produce the primary and secondary masses within the molten glass, the gas bubbling and the thermal barrier being shiftable longitudinally of the furnace, control means for each said gas bubbler means to modulate the gas input to shift said bubbling and thus said thermal barrier longitudinally of the furnace, sensing means for sensing the pressure drop across the forehearth to produce a signal representing throughput of the furnace, and means connecting said pressure drop sensing means and said bubbler control means for shifting said bubbling and thus said thermal barrier in response to said throughput signal.

References Cited

UNITED STATES PATENTS

| | | | |
|---|---|---|---|
| 1,941,778 | 1/1934 | Amsler | 65—135 |
| 2,616,221 | 11/1952 | Hanson | 65—326 X |
| 3,200,971 | 8/1965 | Trethewey | 65—335 X |
| 3,380,463 | 4/1968 | Trethewey | 65—161 X |

S. LEON BASHORE, Primary Examiner

ROBERT L. LINDSAY, JR., Assistant Examiner

U.S. Cl. X.R.

65—158, 162, 326, 335; 73—302